(12) United States Patent
Matsunaga et al.

(10) Patent No.: US 7,280,648 B2
(45) Date of Patent: Oct. 9, 2007

(54) DISPLAY METHOD OF MULTIPLE TYPES OF INCOMING-CALL HISTORIES

(75) Inventors: Keigo Matsunaga, Kawasaki (JP); Kenichi Izumi, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 10/861,468

(22) Filed: Jun. 7, 2004

(65) Prior Publication Data

US 2005/0141686 A1 Jun. 30, 2005

(30) Foreign Application Priority Data

Dec. 25, 2003 (JP) ............................. 2003-429533

(51) Int. Cl.
H04M 1/56 (2006.01)
H04M 15/06 (2006.01)
H04M 3/42 (2006.01)
H04M 1/00 (2006.01)

(52) U.S. Cl. .......................... 379/142.01; 379/142.17; 455/415; 455/466

(58) Field of Classification Search ........... 379/142.01, 379/142.04, 142.06, 142.07, 142.1, 142.11, 379/142.15, 142.16, 142.17; 455/412.02, 455/414.2, 415, 566, 567
See application file for complete search history.

(56) References Cited

U.S. PATENT DOCUMENTS 5,848,356 A * 12/1998 Jambhekar et al. ......... 455/403
6,226,367 B1 * 5/2001 Smith et al. ........... 379/142.04
6,320,943 B1 * 11/2001 Borland ................. 379/112.01
6,738,462 B1 * 5/2004 Brunson ................ 379/142.06
6,937,880 B2 * 8/2005 Teranishi .................... 455/567
6,965,786 B2 * 11/2005 Qu et al. .................... 455/566
2002/0039914 A1 * 4/2002 Hama et al. ................ 455/566
2002/0137551 A1 9/2002 Toba
2006/0035680 A1 * 2/2006 Kokubo ...................... 455/566

FOREIGN PATENT DOCUMENTS

JP 2002-281130 9/2002

* cited by examiner

Primary Examiner—Quoc Tran
(74) Attorney, Agent, or Firm—Kratz, Quintos & Hanson, LLP

(57) ABSTRACT

A terminal apparatus is provided that has a display unit; communication means which makes communication with other apparatuses and enables reception of multiple types of incoming calls; and a control unit which controls display contents on the display unit. The control unit displays, as incoming-call displays on the display unit, types and caller information of unanswered incoming calls out of the incoming calls through the communication means such that order of the unanswered incoming calls can be comprehended.

5 Claims, 8 Drawing Sheets

FIG. 3A

| DATE | INCOMING-CALL TYPE | CALLER OR SENDER | MESSAGE | INCOMING-CALL DISPLAY |
|---|---|---|---|---|
| 21-Nov-2003 10:00 | MAIL | Ken | — | NEED |
| 20-Nov-2003 22:23 | TELEPHONE | Miho | NO | NEED |
| 20-Nov-2003 12:05 | TELEPHONE | Unknown | YES | NEED |
| 20-Nov-2003 1:16 | MAIL | Hanako | — | NO NEED |
| 19-Nov-2003 14:30 | TELEPHONE | Taro | NO | NEED |

FIG. 3B

| DATE | INCOMING-CALL TYPE | CALLER OR SENDER | MESSAGE | INCOMING-CALL DISPLAY | PRIORITY |
|---|---|---|---|---|---|
| 21-Nov-2003 10:00 | MAIL | Ken | — | NEED | A |
| 20-Nov-2003 22:23 | TELEPHONE | Miho | NO | NEED | C |
| 20-Nov-2003 12:05 | TELEPHONE | Unknown | YES | NEED | A |
| 20-Nov-2003 1:16 | MAIL | Hanako | — | NO NEED | C |
| 19-Nov-2003 14:30 | TELEPHONE | Taro | NO | NEED | B |

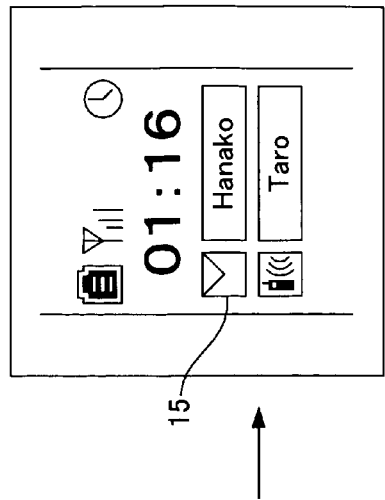
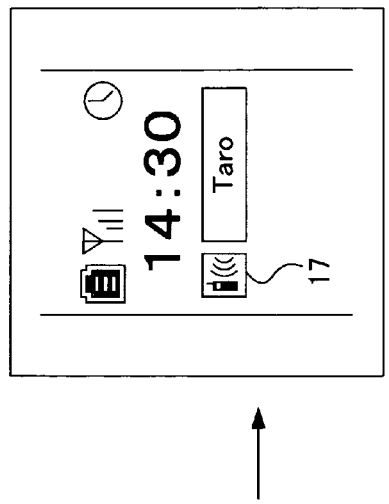
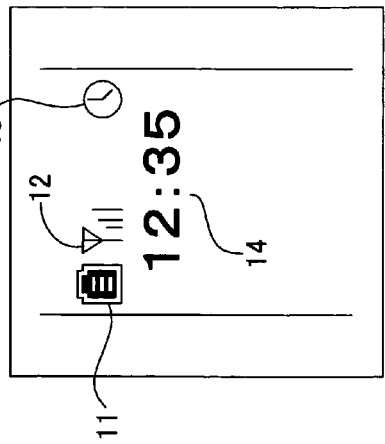
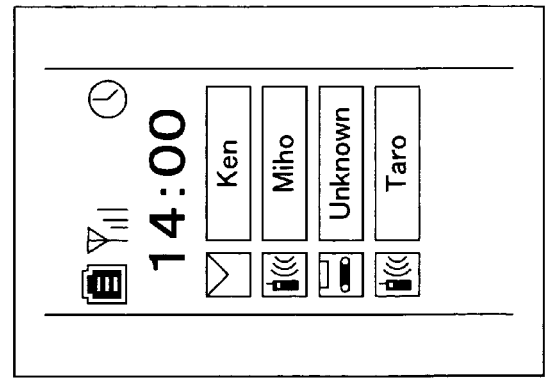

FIG. 6

| RANK | INCOMING-CALL TYPE | CALLER OR SENDER | MESSAGE |
|------|--------------------|-----------------|---------|
| A    | MAIL               | Ken             | ---     |
| A    | TELEPHONE          | Unknown         | YES     |
| B    | TELEPHONE          | Miho            | YES     |
| B    | *                  | Taro            | *       |
| B    | TELEPHONE          | Hanako          | YES     |
| C    | *                  | *               | *       |

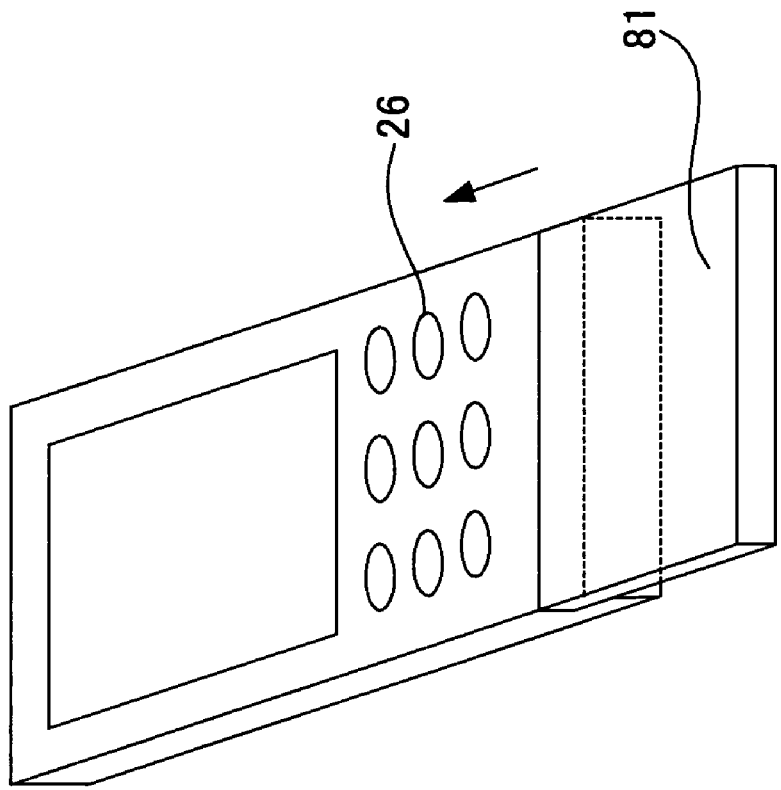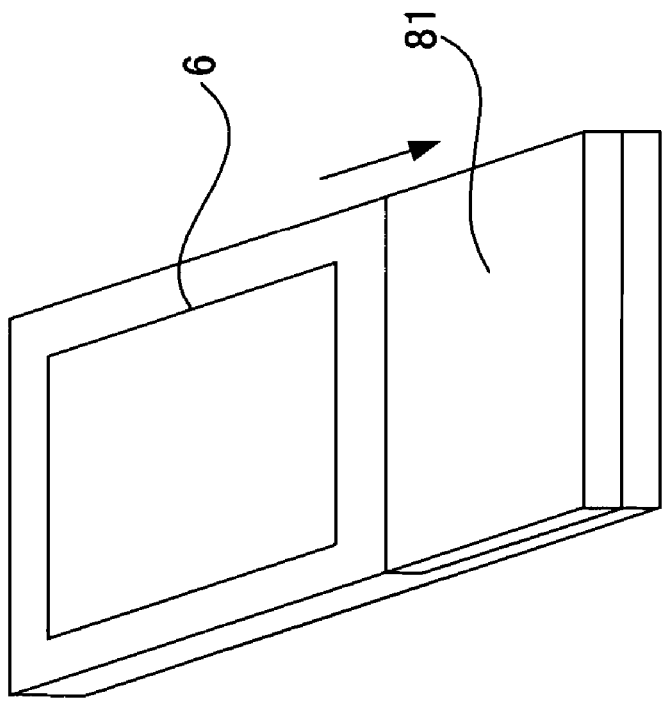

DISPLAY METHOD OF MULTIPLE TYPES OF INCOMING-CALL HISTORIES

BACKGROUND OF THE INVENTION

1. Field of the Invention

The present invention relates to a method of displaying, on a terminal screen of mainly cellular phones, various types of incoming call information, such as incoming telephone calls, incoming e-mails, incoming telephone calls leaving voice messages (messages to an answering-machine function), etc.

2. Description of the Related Art

Traditionally, on a cellular phone (including PHS (Personal Handyphone System)), if a user can not respond when an incoming telephone call or e-mail is received, information on the other party (caller or sender) and a date are stored as an incoming history into memory means of the cellular phone, and a sign is displayed for notifying the user of presence of that incoming call. For example, an icon representing an incoming call, an icon representing an incoming e-mail and an icon representing presence of a voice message (messages left on an answering machine), or text messages such as "incoming call was received" or "two (2) e-mails have been received" are displayed on a screen of the cellular phone.

The user who looks at these notifications identifies types of incoming calls which could not be responded and the number thereof, manipulates the cellular phone to identify caller information, contents of the e-mails and contents of the voice messages and calls back or sends back e-mails.

As prior art references related to these display methods of incoming-call histories, for example, stated in patent document 1 are that, in a folding-type cellular phone which is provided with a sub-display unit along with a main display unit to enable the sub-display unit to be able to be visually recognized in a folded state, in the case that a user can not respond to an incoming call when it is in the folded state, displaying incoming-call histories on the sub-display unit and, by subsequently operating a button on the side of the body, displaying detail information thereof (information on the other party, date, contents of the e-mail), remaining the folded state (see Japanese Patent Application Laid-Open Pub. No. 2002-281130).

However, in conventional examples, it is possible to comprehend what type of and how many incoming calls were received, but it is not possible to comprehend in what order the incoming calls of different types were generated at a glance. Therefore, traditionally, if a user wants to handle the incoming calls in order of occurrence, the user has to identify the incoming e-mail history and the incoming telephone call history individually to determine the order of incoming calls of the different types. In this individual identification operation, since it is not possible to identify different types of incoming calls on the same screen, the user has to perform screen switching operation, resulting in wasting extra times.

Also in conventional examples, an order of priority desired by the user will not displayed in connection with the incoming-call display, and the incoming-call display will not be sorted depending on the order of priority. For example, incoming calls for sales promotions or advertising maybe handled later in some cases. On the contrary, there may be the case that incoming calls from family members or business incoming calls should be handled urgently, and in such a case, if the incoming-call display is in upper rank, this is easily distinguished by the user.

SUMMARY OF THE INVENTION

It is therefore the object of the present invention to provide a display method in which traditionally individually identified information can be identified at a glance by mixing above-mentioned incoming-call information, arranging in predefined order and displaying on a terminal screen.

In order to achieve the above object, according to a major aspect of the present invention there is provided a terminal apparatus including a display unit; communication means which makes communication with other apparatuses and enables reception of multiple types of incoming calls; and a control unit which controls display contents on the display unit, wherein the control unit displays, as incoming-call display on the display unit, types and caller information of unanswered incoming calls out of the incoming calls through the communication means such that order of the unanswered incoming calls can be comprehended.

Preferably, the control unit provides the incoming-call displays in the order of occurrence of the unanswered incoming calls so that the order of occurrence of the unanswered incoming calls can be comprehended. The control unit may display, on the display unit, numbers indicative of the order of occurrence of the unanswered incoming calls as the incoming-call displays so that the order of occurrence of the unanswered incoming calls can be comprehended. The terminal apparatus may further include memory means in which conditions for determining orders of priority of the incoming calls are stored for each order of priority, wherein the control unit further displays orders of priority of the unanswered incoming calls. The displayed type of the incoming call may show that there is at least any one of an unanswered telephone call, an unopened e-mail, an unidentified answering-machine message and an unidentified facsimile document. The caller information may include any one of a caller's telephone number, a sender's e-mail address and a name for identifying a caller. By using a terminal apparatus of the present invention, if multiple types of incoming calls exist, a user can identify incoming-call histories thereof at a glance, and operability and convenience are improved dramatically.

BRIEF DESCRIPTION OF THE DRAWINGS

The above and other objects, aspects, features and advantages of the present invention will become more apparent from the following detailed description when taken in conjunction with the accompanying drawings, in which:

FIG. 1A is a front view; FIG. 1B is a side view; FIG. 1C is a diagram when the portable telephone is in an opened state; and FIG. 1D is a detailed diagram of a sub-display unit;

FIGS. 3A and 3B are diagrams showing a data structure example of incoming-call information;

FIGS. 5A to 5E are specific examples of the transition of the display contents on the sub-display unit;

FIG. 6 is a diagram showing a table of priority conditions;

FIGS. 8A and 8B are diagrams for describing another embodiment of the terminal apparatus of the present invention.

DESCRIPTION OF THE PREFERRED EMBODIMENTS

Embodiments of the present invention will now be described with reference to the drawings. It is to be noted however that the technical range of the present invention is not limited to these embodiments but covers the invention as defined in claims and equivalents thereof.

In the present embodiments, the case of a folding-type cellular phone is described as an example of a terminal apparatus of the present invention.

Figure 1A:
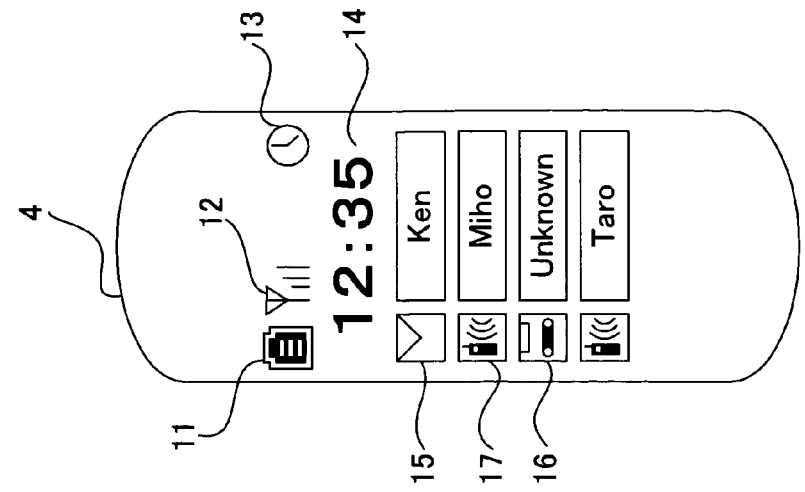
FIGS. 1A to 1D are outside views of a portable telephone in an embodiment of the present invention.
Figure 1B:
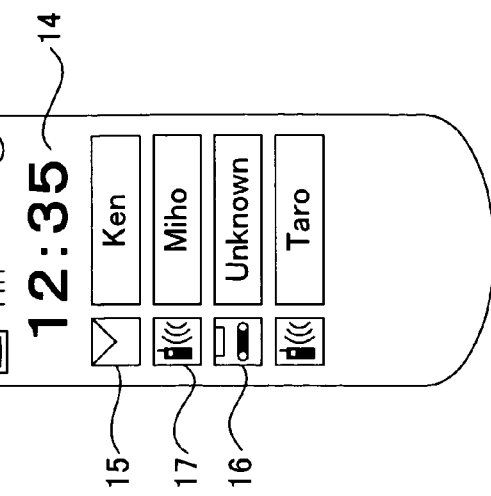

FIGS. 1A to 1D are outside views of a cellular phone (including PHS (Personal Handyphone System)) in an embodiment of the present invention, which illustrates the folding-type cellular phone in a folded state. FIG. 1A is a front view. FIG. 1A illustrates that a sub-display unit 4 which is visually recognized in the folded state is provided on a first housing 1. FIG. 1B is a side view and shows a side button 5, a second housing 2, a first housing 1, an antenna 3 and others provided on the cellular phone of the present embodiment. By operating the side button 5, display contents of the sub-display unit 4 can be manipulated. The second housing 2 is provided with operation buttons (not shown) for inputting instructions to the cellular phone.

Figure 1C:
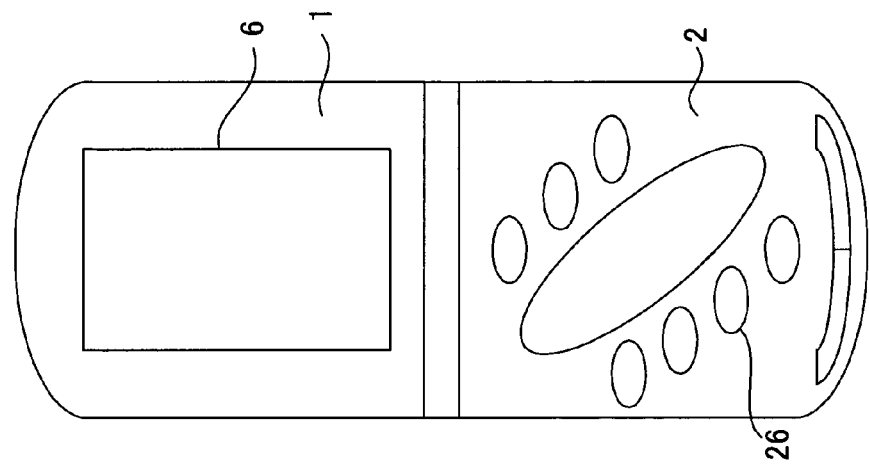

FIG. 1C is a diagram when the cellular phone is in an opened state, by rotating the first housing 1 to a direction of an arrow 7 shown in FIG. 1B. When the cellular phone is opened, a main display unit 6 provided on the first housing 1 can be visually recognized. The main display unit 6 displays diverse information, and, for example, detail information of the incoming-call history, received mails, an operation screen for playing back voice messages and others are displayed. On the second housing 2, a plurality of input buttons 26 is disposed. The input buttons 26 are used for inputting details of the instruction from the user when selecting a cellular phone operation menu and when inputting telephone numbers or e-mail addresses at the time of transmission, and there are a power button (double as a call ending button), a call starting button, dial number buttons, a wrong input canceling button (clear button) and others.

Figure 1D:
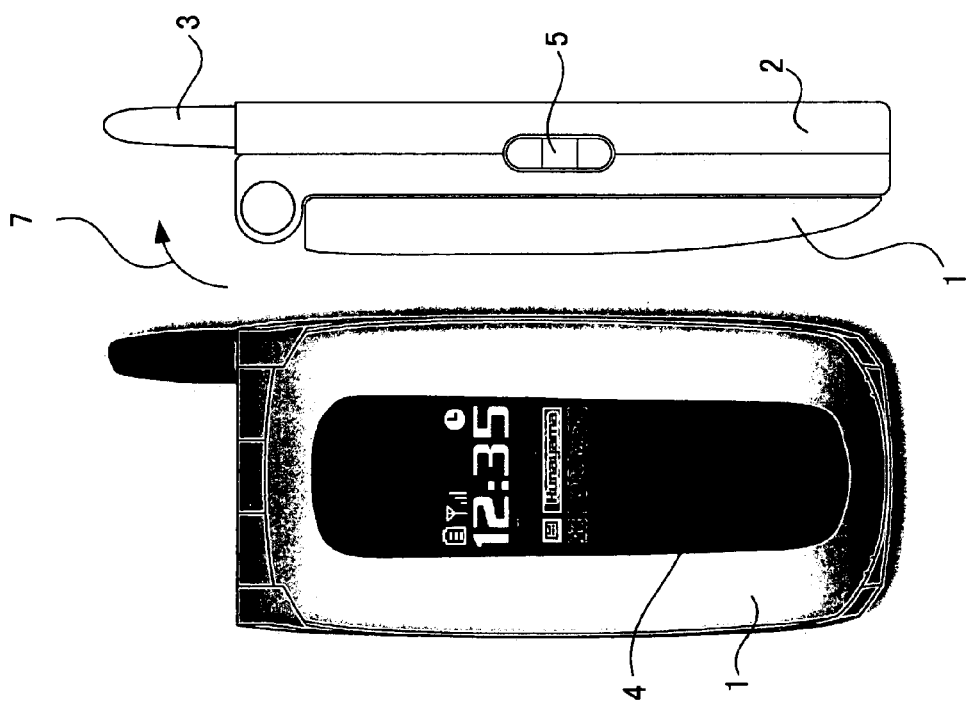

FIG. 1D is an enlarged diagram of the sub-display unit 4, illustrating an example of the incoming-call display which is displayed in a mixed way on the sub-display unit 4. On the sub-display unit 4, in addition to a remaining level of a battery 11, a radio wave receiving condition 12, an icon for indicating a setting status of an alarm 13 and a time 14, multiple types of the incoming-call display are displayed in a mixed way. In FIG. 1D, unanswered calls out of all the types of incoming calls are arranged and displayed in order of reception, and the one which is displayed at the head is the last incoming call. In this case, it is illustrated that the incoming calls are received in the order of an incoming telephone call, an incoming telephone call leaving voice messages (messages left on an answering machine), an incoming telephone call and an incoming mail. Of course, the last incoming call may be displayed at the tail end.

In FIG. 1D, as the incoming-call display, icons for indicating types of incoming calls and text information are used as the incoming-call display, and an icon for indicating presence of the incoming mail 15, an icon for indicating presence of the voice message 16 and an icon for indicating presence of unanswered incoming telephone call 17 are displayed.

The text information by the side of each icon is caller or sender information. "Ken" for the incoming mail icon 15 and "Miho" and "Taro" for the incoming telephone call icon 17 are respectively displayed to identify callers (or senders). Names are displayed by the side of icons because telephone numbers or e-mail addresses and registration names of the callers or senders are stored in a memory of the cellular phone in a corresponding way, and if the caller or the sender is not registered, a telephone number or an e-mail address is directly displayed by the side of an icon. If notification of a caller number is set to be blocked, "Unknown" is displayed as shown on the side of the voice message icon 16 of FIG. 1D.

In this way, using the present invention, the user can identify types of incoming calls and the order of the incoming calls at a glance, and operability and convenience are improved dramatically. A configuration example of the cellular phone and an example of a control operation for display contents of the sub-display unit are then described.

Figure 2:
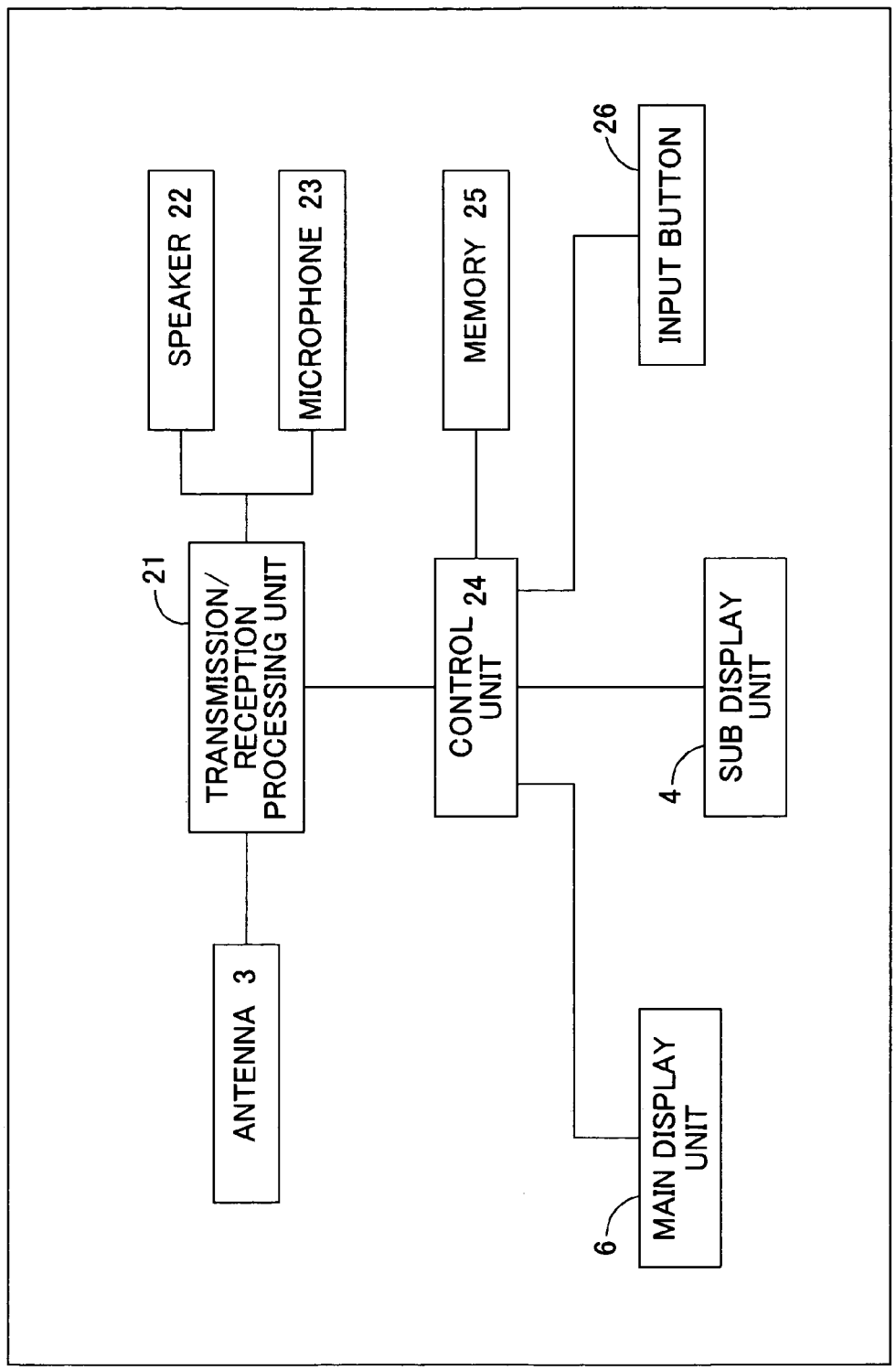
FIG. 2 is a block diagram illustrating a configuration example of the portable telephone of the present embodiment.

FIG. 2 is a block diagram illustrating a configuration example of the cellular phone (including PHS) of the present embodiment. The cellular phone of the present embodiment has an antenna 3, a transmission and reception processing unit 21, a speaker 22, a microphone 23, control unit 24, a memory 25, the sub-display unit 4, the main display unit 6 and the input buttons 26.

The antenna 3 performs transmission and reception of radio waves with a base station. The transmission and reception processing unit 21 modulates voices for transmission input through the microphone 23 and data input via the input buttons 26 to output to the antenna 3 and demodulates radio waves received from the antenna 3 to output to the speaker 22.

The control unit 24 includes CPU, which controls the transmission and reception processing unit 21, the sub-display unit 4, the main display unit 6, the input buttons 26 and the memory 25, and ROM, which stores information necessary for control. The sub-display unit 4 and the main display unit 6 are, for example, display units such as a liquid-crystal display and display various information on the cellular phone. The memory 25 stores operation data used by the control unit 24, incoming-call information for displaying the incoming-call history and others. The input buttons 26 are input means for inputting instructions to the cellular phone, and the side key is a kind of these means. Display contents of the sub-display unit 4 and the main display unit 6 are controlled by the control unit 24, and especially, the incoming-call display which is displayed on the sub-display unit 4 is controlled by the control unit 24 based on the incoming-call information stored in the memory 25. In order to describe the control operation of the incoming-call display, first, a data structure example of the incoming-call information stored in the memory 25 is described.

FIGS. 3A and 3B are diagrams showing the data structure example of the incoming-call information stored in the memory for each time incoming calls are received, and FIG. 3A is the data structure example of the incoming-call information (No. 1). In FIG. 3A, data items of "date", "incoming-call type", "caller or sender", "message" and "incoming-call display" are stored. As "date" and "incoming-call type", dates of receiving incoming calls and types of the incoming calls are stored. As described in FIG. 1D, if information of the caller or sender (telephone number, e-mail address and others) is registered in the memory 25 in advance (as personal telephone book data), a telephone number or an e-mail address is converted to the registered information of the caller or the sender and stored in "caller or sender", but in the case of a call from unregistered party, a telephone number or an e-mail address is directly stored in "caller or sender".

The "message" is flag information indicating whether or not the caller leaves a message using the answering-machine function, and in the case of "yes", the icon for indicating presence of the voice message is displayed. The voice message function is available only for incoming telephone calls, and if the "incoming-call type" is mail, the "message" is a meaningless data item (in FIG. 3A, represented by a hyphen symbol). The "incoming-call display" is flag information indicating necessity of the incoming-call display, and when an incoming-call could not be answered, it is set to "need" (which represents the incoming-call display is necessary), and when contents of the incoming call is identified later, it is changed to "no need".

An example of control operation of display contents performed by the control unit 24 is then described.

Figure 4:
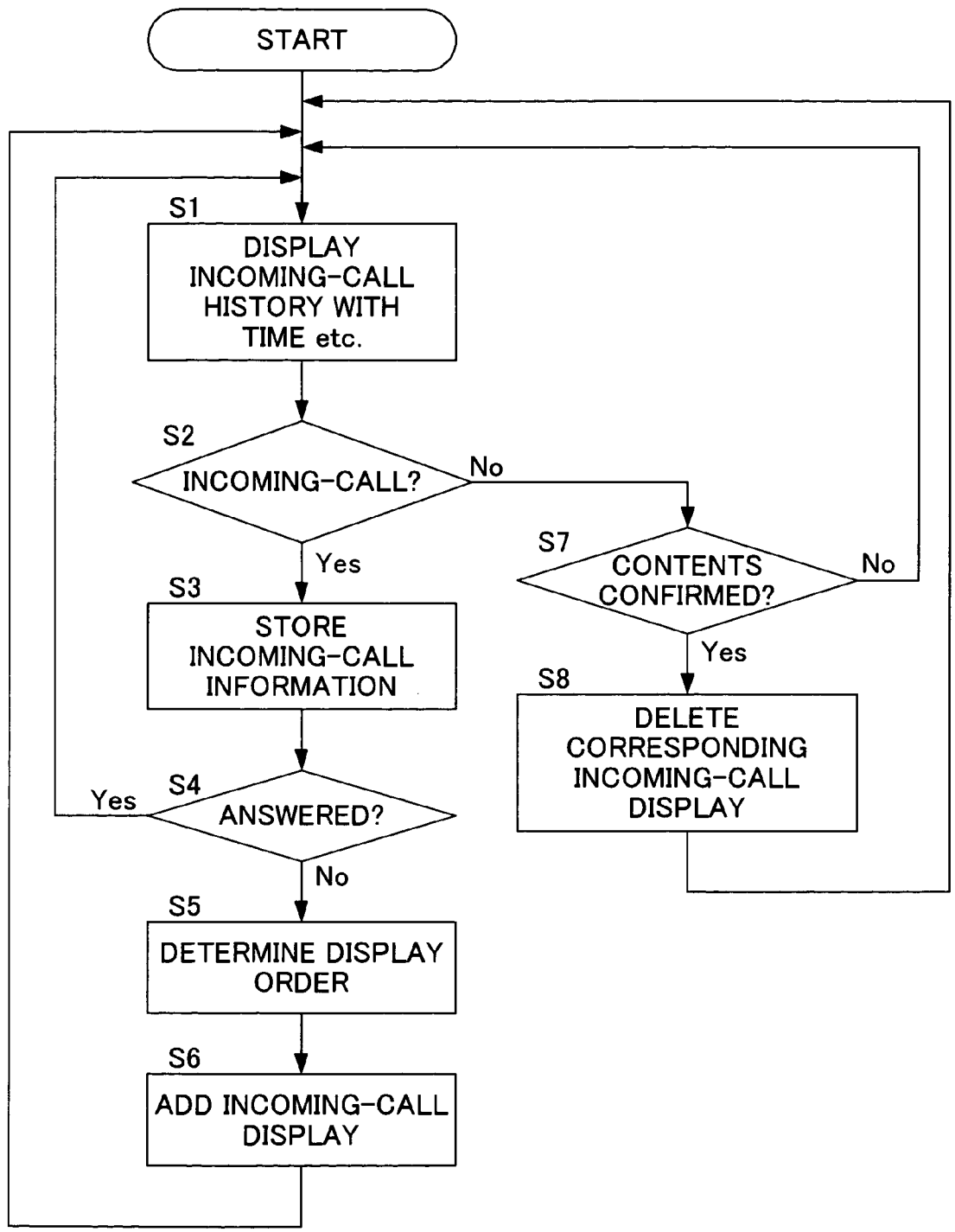
FIG. 4 is a flowchart showing an example of control operation of display contents on the sub-display unit in the portable telephone of the present embodiment.

FIG. 4 is a flowchart showing the example of control operation of display contents on the sub-display unit in the cellular phone (including PHS) of the present embodiment. First, if an unanswered incoming call already exists, the control unit 24 displays its incoming-call history along with a time and others (S1). The control unit 24 displays the icon corresponding to the incoming call whose "incoming-call display" out of the incoming-call information stored in the memory 25 (see FIG. 3A) is "need" in order of "date".

At the time of executing step S1, if all the "incoming-call display" of FIG. 3A is "no need", the control unit 24 does not display the incoming-call history. What is displayed other than the incoming-call history in step S1 is the remaining level of a battery 11, the radio wave receiving condition 12, the icon for indicating a setting status of an alarm 13 and the time 14, which are cited in FIG. 1D, as well as an icon for indicating a setting status of the manner mode (a mode which notifies of an incoming call by means other than sound (vibration, light emitting and others)), an icon for indicating being in the internet connection status and others.

Subsequently, whether there is an incoming call or not is determined (S2). Whether there is an incoming call or not is determined with a signal received by the transmission and reception processing unit 21 via the antenna 3. If there is an incoming call in step S2 (S2 Yes), the control unit 24 stores the incoming-call information into the memory 25 (S3). In step S3, as the incoming-call information, data is respectively stored in the data items of "date of receiving incoming call", "incoming-call type" and "caller", and in "incoming-call display", "no need" is stored as default data, and in "voice message", "no" is stored as default data.

After step S3 is completed, whether the incoming call could be answered or not is then determined (S4). The control unit 24 may determine whether or not the call starting button or others included in the input buttons 26 is pushed within a predefined time period. If the received incoming call can be answered, the determination in step S4 becomes the positive determination (S4 Yes), and after the end of the call, the process returns to step S1. In this case, a record of the incoming call is left as the incoming-call information (see FIG. 3A), but since the "incoming-call display" is "no need", the incoming-call display will not be displayed on the sub-display unit 4 even when returned to step S1. In step S4, along with the case that the incoming telephone call can not be answered, in the case of receiving mails, the determination in step S4 will be negative (S4 No).

In the case that the determination in step S4 is negative (S4 No), the control unit 24 changes the "incoming-call display" of the incoming-call information (see FIG. 3A) stored to the memory 25 in step S3 to "need" as well as determines the display order (S5). Since the incoming-call display is added such that the user can understand the order that incoming calls occur here, for example, if it is set to display the latest incoming-call display at the head, the display order of the added incoming-call display is determined as the head. On the contrary, if it is set to display the latest incoming-call display at the tail end, the display order of the added incoming-call display is determined as the tail end.

The control unit 24 then adds the incoming-call display to the sub-display unit 4 (S6). In step S6, whether the voice message has been left or not is determined first, and if the voice message has been left, the "message" in the incoming-call information is further changed to "yes". The added incoming-call display is an icon corresponding to the incoming mail if the "incoming-call type" in the incoming-call information (see FIG. 3A) is "mail", an icon corresponding to the usual incoming telephone call if the "incoming-call type" is "telephone" and the "message" is "no", or an icon for indicating presence of the voice message if the "incoming-call type" is "telephone" and the "message" is "yes". Along with these icons, the registration name, telephone number, e-mail address and others are displayed depending on the "caller or sender" in the incoming-call information (see FIG. 3A). After step S6 is completed, the process returns to step S1.

If there is no incoming call in step S2 (S2 No), whether or not the contents of the incoming call corresponding to the incoming-call display which is displayed as the incoming-call history are confirmed is determined (S7). At the time of determination of whether the contents are confirmed or not, for example, whether information of the "caller or sender" is displayed on the main display unit 6 or not if it is the incoming telephone call, whether recorded contents of the voice message is played back or not if the voice message is left, whether the body text of the e-mail is displayed on the main display unit 6 or not if it is the incoming e-mail and others can be employed as criteria of the determination. If it is determined in step S7 that the contents are confirmed (S7 Yes), the control unit 24 changes the "incoming-call display" in the incoming-call information (see FIG. 3A) corresponding to the incoming call determined in step S7 that the contents are confirmed, out of the incoming calls corresponding to the incoming-call displays which are displayed as the incoming call histories, to "no need" as well as deletes incoming-call display thereof from the sub-display unit 4 (S8).

The transition of the display contents on the sub-display unit 4 is then described using a specific display example.

FIGS. 5A to 5E are the specific examples of the transition of the display contents on the sub-display unit 4. In FIG. 5A, the remaining level of a battery 11, the radio wave receiving condition 12, the icon for indicating a setting status of an alarm 13 and the time 14 are displayed as usual information. Subsequently, in FIG. 5B, it is showed that an incoming telephone call was generated, to which the user could not answer.

Since the voice message is not left here and the caller is "Taro" whose name is registered in the memory 25, the "incoming-call display" in the incoming-call information (see FIG. 3A) is set to "need" and an icon for indicating presence of an unanswered incoming telephone call 17 is displayed. When the incoming call is arrived, in order to notify the user of the incoming call, the icon 17 and the "Taro" display may be blinked to call the use's attention.

As time elapses further, in FIG. 5C, it is showed that the incoming mail from "Hanako" is arrived. In this way, as time elapses, incoming calls are displayed on the sub-display unit in order, and consequently, the displays are accumulated as shown in FIG. 5D. After the display of FIG. 5D, when the user notices the incoming-call display, displays the mail from "Hanako" on the main display unit 6 and reads and confirms the body text of the mail, the corresponding "incoming-call display" of the incoming-call information is changed to "no need", and the icon 15 for indicating presence of the incoming mail is deleted from the sub-display unit 4 (FIG. 5E). The data of FIG. 3A shows the data structure of the incoming-call information of FIG. 5E.

In the display mode of incoming-call information described above, the incoming-call displays are displayed in a mixed way in order of occurrence of the incoming call, but in come cases, convenience is improved by displaying the incoming-call display in conformity with the order of priority desired by the user. For example, in the case that an incoming call could not answered during a conference or business meeting and that the incoming-call display is identified after the conference or business meeting, the incoming calls for sales promotions or advertising or the incoming calls of which a caller or a sender is not revealed may be handled later in some cases. On the contrary, there may be the case that incoming calls from family members or business incoming calls should be handled urgently, and in such a case, if the incoming-call display is in upper rank, this is easily distinguished by the user. Thus, the case that the incoming-call display is displayed based on the order of priority set by the user is then described.

FIG. 6 is a diagram showing a table of priority conditions which stores conditions used for determining the order of priority. The table of priority conditions is stored in the memory 25 in advance by input from the user. In FIG. 6, data items of "rank", "incoming-call type", "caller or sender" and "message" are stored. The "rank", which indicates the order of priority, is ranked by three (3) levels from A to C in FIG. 6, and the incoming calls belonging to the A rank are the incoming calls which are most important to the user.

The "incoming-call type", "caller or sender" and "message" are information for determining the rank of an incoming call, and when comparing the data included in the incoming-call information and the data in the table of priority conditions for each data item, a completely matched rank is the rank of that incoming call. In the case of FIG. 6, the incoming "mail" from "Ken" is the incoming call belonging to the A rank. Similarly, if it is an incoming call from a caller or a sender "Unknown" which leaves a voice message, the incoming call also belongs to the A rank. Asterisks (symbol *) of FIG. 6 represent all the selectable items. For example, if the asterisk is used for the "incoming-call type", it represents either the mail or the telephone (in the case of other than the present embodiment, facsimile reception and others may be included), and if the asterisk is used for the "caller or a sender", it represents all the callers or senders (regardless of whether the caller or the sender can be identified or not), and if the asterisk is used for the "message", it represents all the incoming telephone calls regardless of whether the voice message is left or not. The final row of FIG. 6, in which all the data items are asterisks, represents that all the incoming calls conforming to neither the A rank nor the B rank belong to the C rank.

FIG. 3B is the data structure example of the incoming-call information (No. 2) in the case that the order of priority of each incoming call is determined by applying the specific priority conditions of FIG. 6 to the specific example of FIG. 3A. In FIG. 3A, an entry of the first row is the incoming "mail" from the caller "Ken", and this incoming call is determined as the A rank by the table of priority conditions of FIG. 6. Similarly, since an entry of the second row of FIG. 3A is the normal incoming telephone call from the caller "Miho", this incoming call is determined as the C rank by the table of priority conditions of FIG. 6 (if a voice message is left, it is the B rank). In similar manner, the order of priority of each incoming call included in FIG. 3B is determined.

An example of control operation in the case that the incoming-call display is displayed depending on the order of priority is then described. This is equivalent to another embodiment of the display order determination step (S5) of FIG. 4 described above and, therefore, described using FIG. 4. But in the description other than that of step S5, the description in common with the case the incoming-call display is displayed in the order of occurrence of the incoming call is omitted.

In FIG. 4, first, if an unanswered incoming call already exists, the control unit 24 displays its incoming-call history along with a time and others (S1). The control unit 24 displays the icon corresponding to the incoming call whose "incoming-call display" out of the incoming-call information stored in the memory 25 (see FIG. 3A) is "need" in order of "priority". Subsequently, whether there is an incoming call or not is determined (S2). If there is an incoming call in step S2 (S2 Yes), the control unit 24 stores the incoming-call information into the memory 25 (S3).

As the incoming-call information, the data structure to which "priority" is added, such as FIG. 3B, is used here. This is the incoming-call information of FIG. 3A used for displaying the incoming-call display in order of occurrence of the incoming call to which the data item of "priority" is added. In step S3, the rank determined by using the table of priority conditions of FIG. 6 is stored in the "priority".

After step S3 is completed, whether the incoming call could be answered or not is then determined (S4). If the received incoming call can be answered, the determination in step S4 becomes the positive determination (S4 Yes), and after the end of the call, the process returns to step S1. In the case that the determination in step S4 is negative (S4 No), the control unit 24 changes the "incoming-call display" of the incoming-call information (see FIG. 3B) stored to the memory 25 in step S3 to "need" as well as determines the display order (S5).

Since the incoming-call display is added such that the user can understand the order of priority, for example, if it is set to display the incoming-call display with higher priority at the head, the display order of the added incoming-call display is determined as the head. On the contrary, if it is set to display the incoming-call display with higher priority at the tail end, the display order of the added incoming-call display is determined as the tail end.

The control unit 24 then adds the incoming-call display to the sub-display unit 4 (S6). In step S6, a similar process in the case of displaying the incoming-call display in the order of occurrence of the incoming call may be performed. After step S6 is completed, the process returns to step S1

If there is no incoming call in step S2 (S2 No), whether or not the contents of the incoming call corresponding to the incoming-call display which is displayed as the incoming-call history are confirmed is determined (S7). If it is determined in step S6 that the contents are confirmed (S7 Yes), the control unit 24 changes the "incoming-call display" in the incoming-call information (see FIG. 3B) corresponding to the incoming call determined in step S7 that the contents are confirmed, out of the incoming calls corresponding to the incoming-call displays which are displayed as the incoming call histories, to "no need" as well as deletes incoming-call display thereof from the sub-display unit 4 (S8).

Figure 7A:
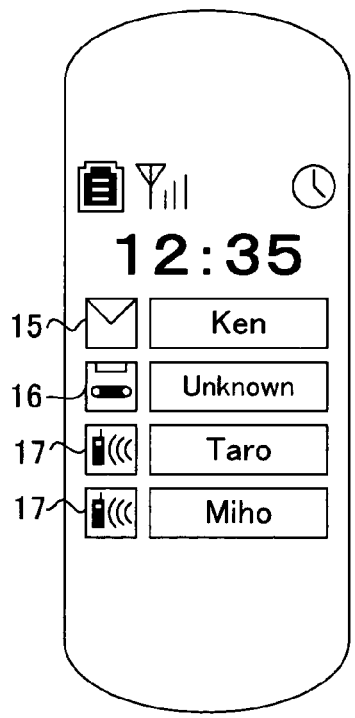
FIGS. 7A to 7F are examples of a mixed display of the incoming-call displays.

FIGS. 7A to 7F are examples of a mixed display of the incoming-call displays in the cellular phone (including PHS) to which the order of priority is set. FIG. 7A is an example of the case that the incoming-call displays are displayed in mixed way based on the order of priority of FIG. 3B. Following the incoming "mail" from the caller "Ken" (icon 15) and the incoming telephone call of which the voice message is left from the caller "Unknown" (icon 16), which are in the A rank, the B rank incoming telephone call from the caller "Taro" (icon 17) and the C rank incoming telephone call from the caller "Miho" (icon 17) are displayed. Either two (2) incoming-call displays belonging to the A rank may be displayed at the head, but these are displayed here such that the latest incoming call is displayed at the head. By displaying the incoming-call displays in a mixed way as shown in FIG. 7A, a user can identify at a glance whether or not there is an incoming call of which priority set by the user is high.

Figure 7B:
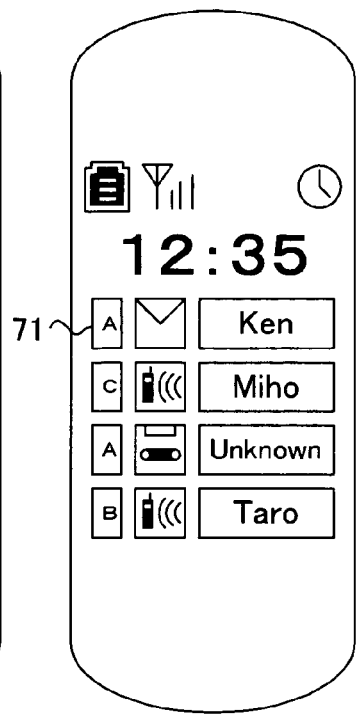

In FIG. 7B, based on the display method of FIG. 1D which displays the incoming-call display in the order of occurrence of the incoming call, the display method of FIG. 7A which displays the incoming-call display in the order of priority is combined. Although the incoming-call display is displayed in the order of occurrence of the incoming call, the order of priority 71 thereof is displayed along with the icon.

Figure 7C:
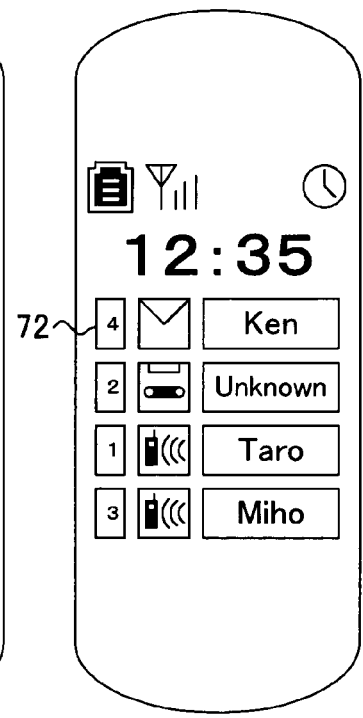

Contrary to FIG. 7B, in FIG. 7C, based on the display method of FIG. 7A which displays the incoming-call display in the order of priority, the display method of FIG. 1D which displays the incoming-call display in the order of occurrence of the incoming call is combined. Although the incoming-call display is displayed in the order of priority, the order of occurrence thereof 72 is displayed along with the icon. The order of occurrence is the order obtained by sorting the "date" of the incoming calls whose "incoming-call display" included in the incoming-call information (See FIG. 3B) is "need" in ascending order. Of course, this may be in descending order. With FIG. 7B and FIG. 7C, the user can learn the order of occurrence of the incoming call and the order of priority at the same time.

Figure 7D:
Figure 7E:
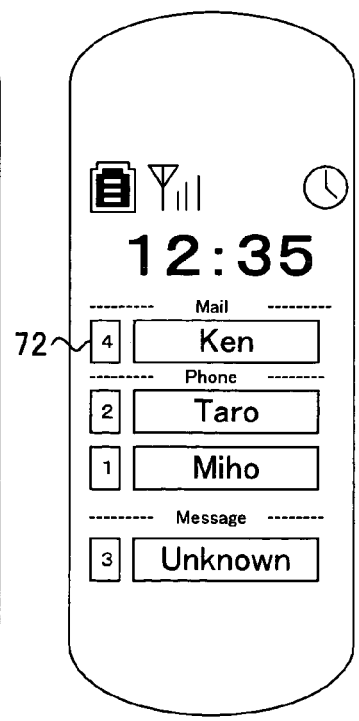
Figure 7F:
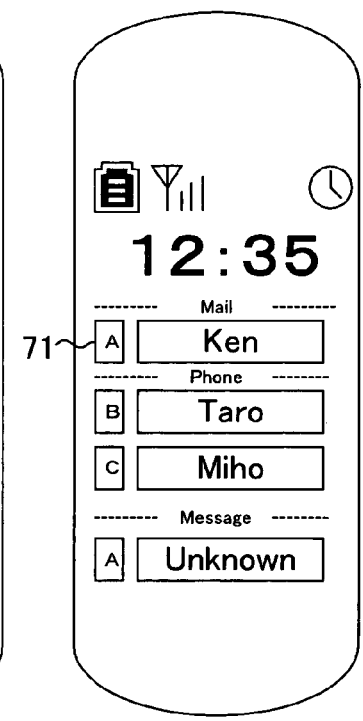

FIG. 7D is an example which displays the incoming-call display in a mixed way such that the one with the highest priority for each type of the incoming call is arranged at the head. With FIG. 7D, all the incoming calls can be comprehended together with the order of priority thereof. In FIG. 7E, the order of occurrence of the incoming call 72 is added to FIG. 7D. In FIG. 7F, the order of priority 72 is added to FIG. 7D. In FIG. 7D, superiority and inferiority of the order of priority for each type of the incoming call can be relatively comprehended, but displaying the absolute order of priority is more convenient for the user. With FIGS. 7D to 7F, the user can learn the order of priority of the incoming calls.

In FIG. 7D, instead of displaying the incoming-call display in a mixed way such that the one with the highest priority for each type of the incoming call is arranged at the head, it is possible to display the incoming-call display in a mixed way such that the latest incoming call for each type of the incoming call is arranged at the head. The user can then learn the order of the incoming call for each type of the incoming call.

The number of the order of priority has no upper limit, and in FIG. 6, a plurality of conditions are provided in one (1) rank, but one (1) condition can correspond to one (1) rank.

As described above, by using the present invention, if multiple types of incoming calls exist, the user can identify incoming-call histories thereof at a glance, and operability and convenience are improved dramatically. Also, since the user can determine the order of priority freely for the display order of the incoming-call displays, it is possible to sort out incoming-call displays of necessary (high emergency) incoming calls and other incoming calls.

In embodiments of the present invention, as an example of the terminal apparatus combining the e-mail transmitting and receiving function and the telephone-call sending and receiving function, the case that the incoming-call displays are displayed on the sub-display unit 4 of the folding-type cellular phone is described, but even in the case that the incoming-call displays are displayed on the main display unit 6, the present invention is applicable.

FIGS. 8A and 8B are diagrams for describing another embodiment of the terminal apparatus of the present invention. FIGS. 8A and 8B are diagrams illustrating PDA (Personal Digital Assistance) of which input buttons 26 is revealed by moving a cover 81. FIG. 8A illustrates a state that the cover 81 is closed, and FIG. 8B illustrates a state that the cover is opened. The PDA of FIG. 8A displays diverse information and is provided with a main display unit 6 on which, for example, detail information of the incoming-call history, received mails, an operation screen for playing back voice messages and others are displayed. The PDA has a CF (Compact Flash) slot, and communication is enabled by inserting a CF card having a data communication function.

In such a PDA, different types of incoming calls, such as incoming telephone calls, incoming mails and facsimile reception and others, are generated, and therefore, by displaying the incoming-call displays on the main display unit 6 in a mixed way in the predefined order stated above, the working efficiency of the user can be improved.

Further, it is possible to apply to all the terminal apparatuses having a display unit (regardless of main or sub) for displaying the incoming displays, which is not limited to the folding-type cellular phone shown in FIGS. 1A to 1D (including other types such as a straight type, a flip type, a rotating type and a slide type). Therefore, for example, it is possible to apply to a fixed telephone and others having the display unit.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A cellular apparatus comprising:
   a main display unit being capable of displaying content;
   a sub-display unit being capable of displaying content;
   a memory means being capable of storing conditions for determining orders of priority of incoming calls;
   a communication means being capable of making communication with other apparatuses and enabling reception of multiple types of incoming calls; and
   a control unit being capable of controlling the display contents on the display unit and sub-display unit according to the orders of priority;
   wherein the control unit controls the display content of the sub-display unit so that the display content shows different types and caller information of accumulated unanswered incoming calls among the incoming-calls received through the communication means according to a selected order of priority stored in the memory means so that a user can understand an incoming call history and order of priority of different types of accumulated unanswered incoming calls with one glance, and, the selected order of priority is an order based on an incoming call type, caller, or sender.

2. The cellular apparatus according to claim 1, wherein the order of priority stored in the memory means is an order of the unanswered incoming calls so that the order of the unanswered incoming calls can be comprehended.

3. The cellular apparatus according to claim 1, wherein the order of priority stored in the memory means is an order of occurrence and the display content includes numbers indicative of the order of the unanswered incoming calls so that the order of the unanswered incoming calls can be comprehended.

4. The cellular apparatus according to claim 1, wherein the displayed type of the incoming call shows that there is at least any one of an unanswered telephone call, an unopened e-mail, an unidentified answering-machine message and an unidentified facsimile document.

5. The cellular apparatus according to claim 1, wherein the caller information includes any one of a caller's telephone number, a sender's e-mail address and a name for identifying a caller or a sender.

* * * * *